UNITED STATES PATENT OFFICE.

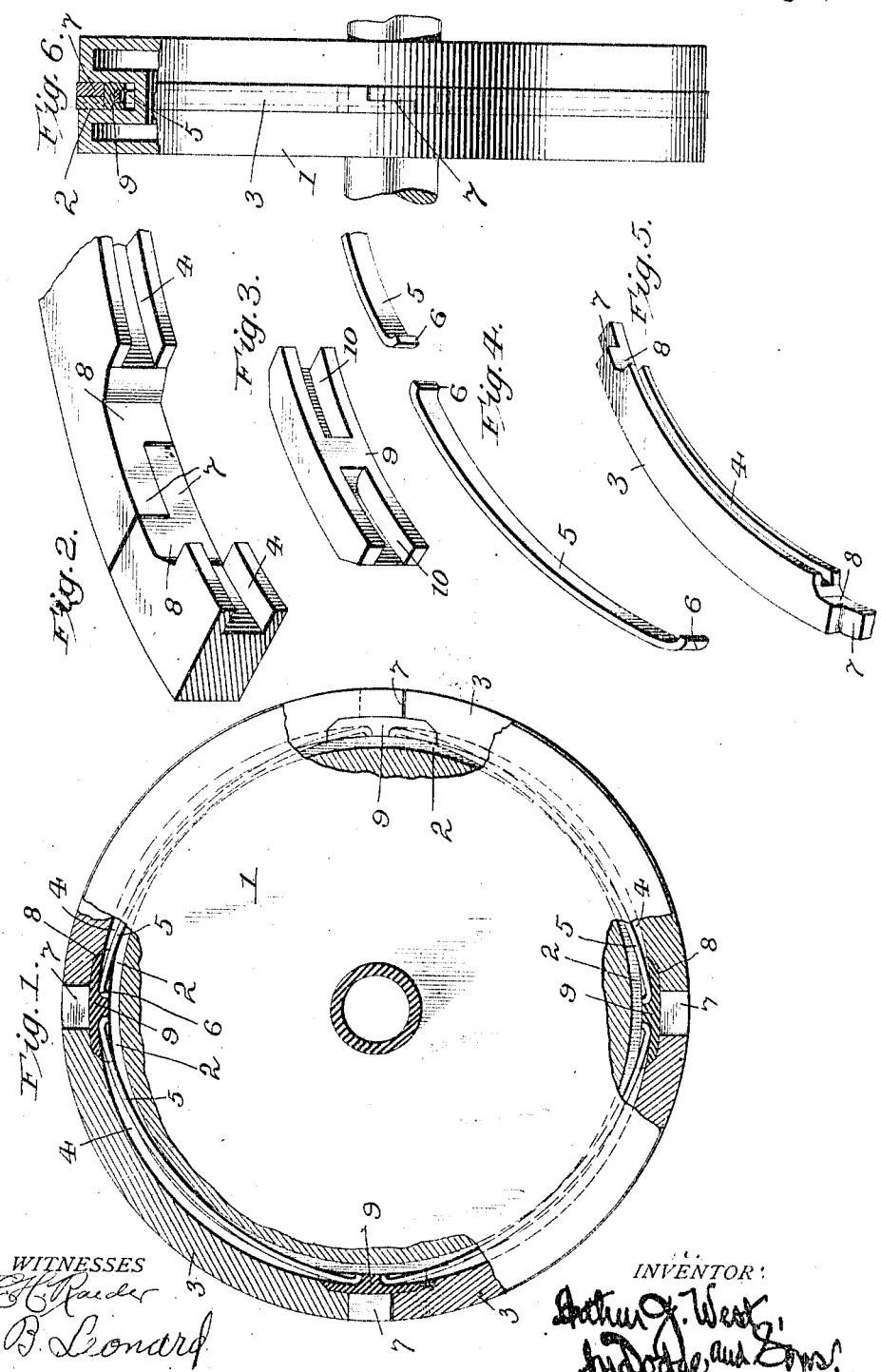

ARTHUR J. WEST, OF BETHLEHEM, PENNSYLVANIA.

PISTON PACKING-RING.

1,000,135.

Specification of Letters Patent.

Patented Aug. 8, 1911.

Application filed June 30, 1910. Serial No. 569,724.

*To all whom it may concern:*

Be it known that I, ARTHUR J. WEST, a citizen of the United States, residing at Bethlehem, in the county of Northampton and State of Pennsylvania, have invented certain new and useful Improvements in Piston Packing-Rings, of which the following is a specification.

My present invention relates to packing rings for pistons and particularly to a packing ring designed for gas engines, such engines, especially when of the double acting type, requiring exceptionally thorough packing of the piston.

Heretofore many forms of packing ring have been devised but most of these have employed a keeper which was spring retained and formed a portion of the packing ring proper. The keeper was thus exposed to the direct heat and pressure of the explosions and being of small size great difficulty was experienced in finding a metal which at once possessed sufficient strength for the service and was capable of withstanding the heat. Cast iron keepers continually fail in such service while bronze alloys will fuse except when the constituents of the alloy are most carefully selected. Steel and wrought iron are apt to cut the cylinder walls and hence are unsatisfactory. Furthermore the pressure of the explosion being greater than the pressure in the packing ring grooves, the keepers are frequently blown down into the grooves, leaving gaps between the ends of the ring sections through which incandescent gases blow past the piston and ignite the combustible mixture then present in the other end of the cylinder. To avoid these various difficulties it is necessary to devise a form of keeper which is not directly subject to the force and heat of the explosion and forms no part of the face of the piston ring, so that if the keeper be blown down into the ring groove, the rings will still prevent leakage past the piston.

To secure this result without unduly increasing the depth of the packing ring grooves or requiring complicated spring structures undesirable in the hollow pistons necessarily used in large gas engines, is the purpose of my invention which is illustrated in the accompanying drawings, in which:—

Figure 1 is a side view of an arbitrary form of piston shown merely to illustrate the mode of mounting the rings, but one ring being shown on the piston in this case; Fig. 2 is an enlarged perspective view of the ends of two ring sections in contact; Fig. 3 is an enlarged perspective view of a keeper; Fig. 4 is an enlarged perspective view of the spring; Fig. 5 is a perspective view of an entire ring section; and Fig. 6 is an end view of the piston shown in Fig. 1 and illustrating the positions assumed by the various parts.

1 represents the piston, which for the sake of simplicity is represented as having a single piston ring groove 2, though obviously more would usually be provided. The ring is shown as made in four sections 3, though the number of such sections may vary. Each section is provided with a groove 4 on its inner face into which fits a leaf spring 5 having its ends slightly curved as at 6. The ends of the sections are scarfed or lapped as at 7 and a recess 8 is cut on the inner side at the points of junction of the sections. A keeper 9 is formed to accurately fill the recess 8, this keeper having grooves 10 extending from each end toward the middle of the keeper and forming extensions of the grooves 4. The rings are assembled in the groove 2 on the piston with the keepers in the recesses 8 and the springs partially in the grooves 4 and terminating at each end in the grooves 10. The springs are so formed that they bear at their middles on the bottom of the groove 2 and at their ends 6 outwardly on the keepers. The keepers are comparatively thin so as to lie deep in the groove 2, and when the piston is in the cylinder the springs lie largely in the grooves 4. In this way the keepers are so deeply located in the grooves that danger of their being blown down is minimized, while due to the grooves 4 in the ring sections a minimum clearance may be allowed for the springs beneath the rings so that there is small likelihood of gases blowing under the rings or between the keeper and the rings. It will be noted that inasmuch as the springs lie in the grooves of both the ring sections and keepers they tend to preserve accurate alinement of such parts under all conditions. Since the ends of the sections overlap, the rings are still operative even though a keeper be blown down into the groove and as the keepers are not subjected to direct heat or pressure and are of simple form, considerable range is allowed in the selection of material and cast iron may be successfully used. The keepers are designed not to exert a wedging force on the ring sections but to give a direct radial thrust. Thus any tendency to cramp is avoided and the keepers may be thinner radially than would be possible were they intended to act as wedges.

Obviously, due to the form of spring used and to the groove on the ring sections, the packing ring grooves may be of a comparatively shallow depth and still insure that the keepers be always below the face of the groove. This is of the utmost importance in a hollow, water cooled piston because it permits a thinner piston rim and hence better cooling. Also the groove, is of the very simplest form, conducing to ease of manufacture.

Having thus described the invention, what I claim is:—

1. The combination of a piston having a packing ring groove; a packing ring composed of a plurality of sections having overlapping ends, the said sections being grooved on their inner faces; a keeper lying in a recess in said ring sections at each point of junction; and springs lying partially in the grooves in said ring sections, bearing at their ends on the keepers and near their middles on the bottom of the packing ring groove.

2. The combination of a piston having a packing ring groove; a packing ring composed of a plurality of sections having overlapping ends, the said sections being grooved on their inner faces; a keeper lying in a recess in said ring sections at each point of junction; and springs lying partially in the grooves in said ring sections, and urging said keepers outwardly.

3. The combination of a piston having a packing ring groove; a packing ring therein composed of a plurality of sections having overlapping ends, the said sections being grooved on their inner faces; a plurality of keepers, one of said keepers lying beneath each of the ring sections where they overlap and bridging their line of junction, said keepers having grooves forming continuations of the grooves in adjacent ring sections; and springs lying partially in said grooves in the ring sections and keepers, each spring bearing at its ends against two of the keepers and near its middle against the bottom of the packing ring groove.

4. The combination of a piston having a packing ring groove; a packing ring mounted therein formed of sections overlapping at their ends and grooved on their inner faces; and springs located partially in the grooves in said sections, seated at their centers in the ring groove and arranged to urge said sections outwardly.

5. A packing ring for pistons comprising in combination, ring sections overlapping at their ends and grooved on their inner faces; keepers engaging said sections adjacent their points of junction and provided with grooves forming continuations of the grooves in adjacent ring sections; and springs engaging said keepers and lying partially in said grooves.

6. In combination with a piston having an annular groove formed around the same; a packing ring mounted in the groove, said ring being composed of a plurality of sections having overlapping ends each of said sections being formed with a groove upon its inner face; a keeper located at the point of junction of said sections, and bridging the same; and a plurality of bow-shaped springs one for each section, said springs bearing at their centers upon the bottom of the groove in the piston and having their ends engaging the adjacent pair of keepers and tending to urge the same outwardly and consequently to extend the packing.

7. In combination with a piston having an annular groove formed around the same; a packing ring mounted in the groove, said ring being composed of a plurality of sections having overlapping ends, each of said sections being formed with a groove upon its inner face; keepers located at the points of junction of said sections, bridging the same and having grooves extending from the ends toward the middle of the keepers forming extensions of the grooves in the ring sections; and a plurality of bow-shaped springs, one for each section, said springs bearing at their centers upon the bottom of the groove in the piston and having rounded ends engaging the grooves of the adjacent pair of keepers to urge the same outwardly to extend the packing.

8. A packing ring for pistons comprising in combination a plurality of ring sections overlapping at their ends, said sections being grooved on their inner faces; keepers engaging said sections beneath their point of junction and provided with grooves extending from their ends toward their middles, such grooves being adapted to form extension of the grooves in the ring sections; and a plurality of springs arranged circumferentially beneath the packing ring sections, the said springs bearing at their ends in the grooves in the keepers and lying at intermediate points within the grooves in the ring sections whereby the springs tend to preserve the alinement of the ring sections and keepers.

In testimony whereof I have signed my name to this specification in the presence of two subscribing witnesses.

ARTHUR J. WEST.

Witnesses:
B. A. BRENNAN,
J. E. PICKARD.